Patented Dec. 27, 1927.

1,654,289

UNITED STATES PATENT OFFICE.

IVAN GUBELMANN, HENRY J. WEILAND, AND OTTO STALLMANN, OF SOUTH MILWAUKEE, WISCONSIN, ASSIGNORS TO THE NEWPORT COMPANY, OF CARROLLVILLE, WISCONSIN, A CORPORATION OF DELAWARE.

PROCESS OF PREPARING PARA'-HYDROXY-ORTHO-BENZOYL BENZOIC-ACID.

No Drawing.    Application filed November 29, 1926.    Serial No. 151,590.

This invention relates to a method of preparing para'-hydroxy-ortho-benzoyl-benzoic-acid. We have discovered that para'-hydroxy-ortho-benzoyl-benzoic acid may be prepared by treating para'-halogen-ortho-benzoyl-benzoic acid, or its salts, in a water or alcoholic solution with alkaline reacting substances. This reaction proceeds at a reasonable rate at elevated temperatures, the rate of reaction increasing in proportion to the temperature. In carrying out the reaction, any suitable alkaline reacting substance may be used, such as caustic soda or potash, sodium or potassium carbonate or the like, all of these alkaline substances giving the same end product.

The general reaction may be expressed by the following chemical equation, in which M represents a metallic radical and hlg represents a halogen element:

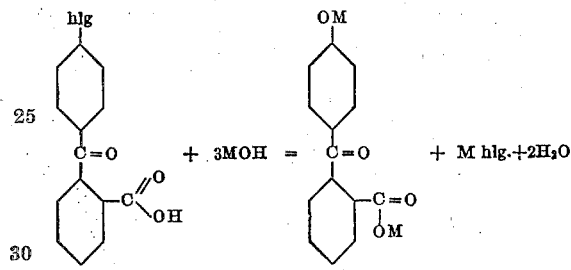

The product obtained is para'-hydroxy-ortho-benzoyl-benzoic acid having a melting point of 212-213° C. after recrystallization from hot water.

Without limiting our invention to any particular procedure, the following example in which parts by weight are given illustrates the application of our invention in the preferred form:

A mixture of 130 parts of crude para'-chloro-ortho-benzoyl-benzoic acid, 600 parts of water and 66 parts of sodium hydroxide in the form of a 40° Bé. solution is heated in an autoclave to 150-200° C. for a period of 12 hours. The pressure is maintained between 100 and 200 pounds per square inch. At the end of this period, the reaction mass, which is a clear yellow solution, after cooling down is slowly run into a mixture consisting of 1000 parts of ice, 1000 parts of water and 75 parts of sulfuric acid (60° Bé.). The precipitated product is now filtered off and dried at 100° C. The yield is 115 parts, corresponding to 95% of theory, with a melting point on the crude of 209 to 210° C. Upon recrystallization from hot water, the melting point is 212-213° C.

It is obvious that instead of starting with para'-chloro-ortho-benzoyl-benzoic acid any other para' halogen derivative may be employed.

We are aware that numerous details of the process may be varied through a wide range without departing from the spirit of this invention and we do not desire limiting the patent granted hereon otherwise than as necessitated by the prior art.

We claim as our invention:

1. The process of preparing para'-hydroxy-ortho-benzoyl-benzoic acid and its salts, which comprises treating para'-halogen-ortho-benzoyl-benzoic acid and its salts with an alkaline reacting substance, whereby the halogen is split off and replaced by an hydroxyl group accompanied by the formation of alkali halide.

2. The process of preparing para'-hydroxy-ortho-benzoyl-benzoic acid, which comprises treating para'-chloro-ortho-benzoyl-benzoic acid with an alkaline reacting substance, whereby the chlorine atom is replaced by an hydroxyl group accompanied by the formation of alkali chloride.

3. The process of preparing para'-hydroxy-ortho-benzoyl-benzoic acid, which comprises treating para'-chloro-ortho-benzoyl-benzoic acid with caustic alkali, whereby the chlorine atom is replaced by an hydroxyl group accompanied by the formation of alkali chloride.

4. The process of preparing para'-hydroxy-ortho-benzoyl-benzoic acid, which comprises heating para'-chloro-ortho-benzoyl-benzoic acid with a solution of caustic alkali to a temperature of between 150 and 200° C. at a pressure of 100-200 pounds per square inch, whereby the chlorine atom is split off to form alkali chloride and replaced by an hydroxyl group.

5. The process of preparing para'-hydroxy-ortho-benzoyl-benzoic acid which comprises heating approximately two parts of para'-chloro-ortho-benzoyl-benzoic acid with one part of caustic alkali in the form of its water solution at a temperature of between 150 and 200° C. and at a pressure of 100 to 200 pounds per square inch for a prolonged period of time, cooling and precipitating out the product.

In testimony whereof we have hereunto subscribed our names.

IVAN GUBELMANN.
HENRY J. WEILAND.
OTTO STALLMANN.